Figure 1:
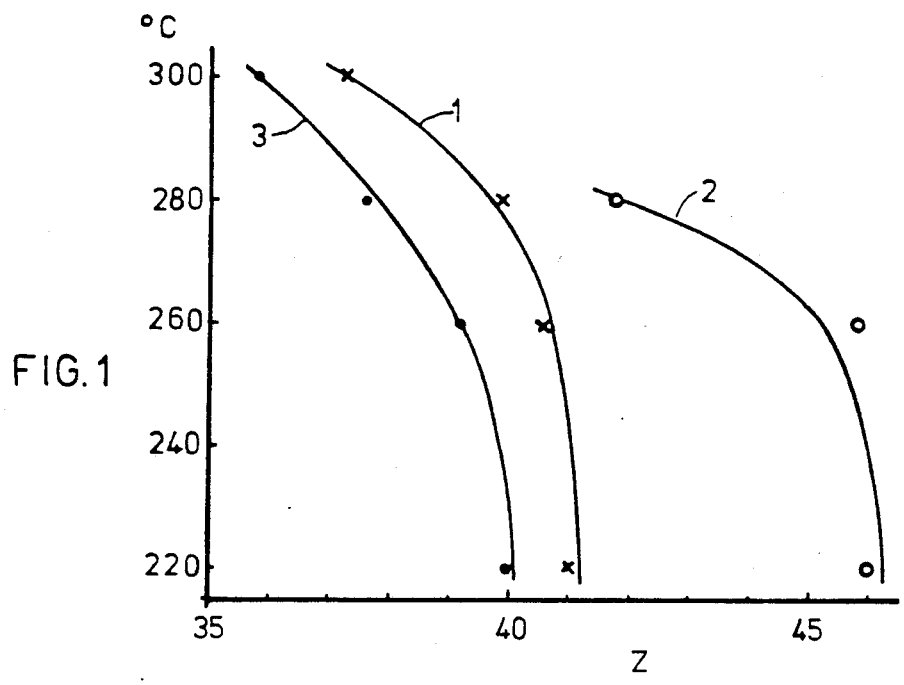

United States Patent [19]

Kress et al.

[11] Patent Number: 4,632,956

[45] Date of Patent: Dec. 30, 1986

[54] STABILIZER SYSTEMS FOR ABS PLASTICS AND ABS ALLOYS

[75] Inventors: Hans-Jürgen Kress, Krefeld; Herbert Eichenauer, Dormagen; Karl-Heinz Ott, Leverkusen; Jochen Schoeps, Krefeld; Alfred Pischtschan, Kuerten, all of Fed. Rep. of Germany

[73] Assignee: Bayer Aktiengesellschaft, Leverkusen, Fed. Rep. of Germany

[21] Appl. No.: 774,730

[22] Filed: Sep. 11, 1985

[30] Foreign Application Priority Data

Sep. 22, 1984 [DE] Fed. Rep. of Germany ....... 3434939

[51] Int. Cl.$^4$ ............................................. C08K 5/07
[52] U.S. Cl. .................................................. 524/359
[58] Field of Search ............... 523/123, 124, 125, 126; 524/359; 204/159.14; 430/286; 525/385, 938; 522/40, 79, 130

[56] References Cited

U.S. PATENT DOCUMENTS

| | | | |
|---|---|---|---|
| 3,764,324 | 10/1973 | Reyes | 430/286 |
| 3,787,212 | 1/1974 | Heimsch et al. | 430/286 |
| 3,790,389 | 2/1974 | Heimsch et al. | 430/286 |
| 4,056,665 | 11/1977 | Taylor et al. | 524/359 |
| 4,199,540 | 4/1980 | Adellman et al. | 204/159.14 |
| 4,204,047 | 5/1980 | Margotte et al. | 525/67 |
| 4,476,255 | 10/1984 | Bailey et al. | 523/125 |

*Primary Examiner*—Veronica P. Hoke
*Attorney, Agent, or Firm*—Connolly and Hutz

[57] ABSTRACT

Thermoplastic moulding compounds containing an ABS plastics and optionally other plastics are stabilized with a benzoin derivative corresponding to the following general formula:

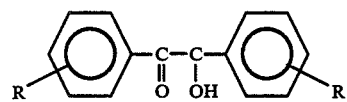

wherein R represent, independently of one another, hydrogen, $C_1$–$C_6$ alkyl or halogen; used in quantities of from 0.05 to 2%, by weight, based on the plastics.

3 Claims, 2 Drawing Figures

STABILIZER SYSTEMS FOR ABS PLASTICS AND ABS ALLOYS

ABS plastics are obtained by the polymerisation of resin-forming monomers in the presence of a rubber. In this process, part of the resin-forming monomer is polymerised and simultaneously chemically bound to the rubber, while another part is polymerised on its own. This mixture is described as a graft polymer and in itself constitutes an ABS plastics. The properties of such graft polymers may be altered by the further addition of a resin, i.e. a free polymer of resin-forming monomers. These products are also described as ABS plastics. The term "ABS" originally used for graft polymers of styrene and acrylonitrile on polybutadiene is now used for all resin-forming monomers and all rubbers.

The present invention is based on the finding that benzoin and/or its alkyl- or halogen-substituted derivatives considerably improve the thermostability and resistance to oxidation of ABS plastics and of plastics alloys containing ABS plastics, in particular alloys of this type with aromatic polycarbonates.

The present invention relates to moulding compositions containing ABS plastics and optionally other plastics, preferably aromatic polycarbonates, and stabilized against the action of heat by means of a benzoin derivative corresponding to the following general formula:

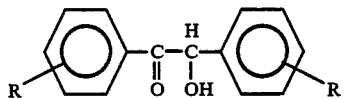
(I)

wherein each R represents, independently of the other, hydrogen, $C_1$–$C_6$ alkyl or halogen; used in a quantity of from 0.05 to 2% by weight, preferably from 0.2 to 1%, by weight, based on the plastics.

The present invention in particular relates to thermoplastic moulding compounds containing:

I. from 100 to 20 parts, by weight, of an ABS polymer having the following composition:
  A. from 5 to 100%, by weight, preferably from 5 to 80%, by weight, of a graft copolymer prepared by the graft polymerisation of:
    A1. from 10 to 95%, by weight, preferably from 10 to 80%, by weight, of a mixture of:
      A1.1. from 50 to 90%, by weight, of styrene, α-methyl styrene, nuclear-substituted styrene or methyl methacrylate or mixtures thereof; and
      A1.2. from 50 to 10%, by weight, of (meth)acrylonitrile, methyl methacrylate, maleic acid anhydride, N-substituted maleimide or mixtures thereof; on
    A2. from 90 to 5%, by weight, preferably from 90 to 20%, by weight, of a rubber having a glass temperature TG of 0° C. or less;
  and
  B. from 95 to 0%, by weight, preferably from 95 to 20%, by weight, of a thermoplastic copolymer of:
    B1. from 90 to 50%, by weight, of styrene, α-methyl styrene, nuclear-substituted styrene or methyl methacrylate or mixtures thereof; and
    B2. from 50 to 10% by weight, of (meth)acrylonitrile, methyl methacrylate, maleic acid anhydride, N-substituted maleimide or mixtures thereof;
II. from 0 to 80 parts, by weight, of an aromatic polycarbonate; and
III. from 0.05 to 2%, by weight, of I+II, of a benzoin derivative corresponding to the following general formula:

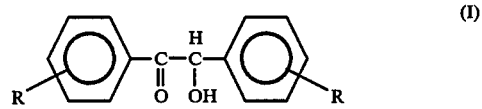
(I)

wherein each R represents, independently of the other, hydrogen, $C_1$–$C_6$ alkyl or halogen.

Both moulding compounds which contain no polycarbonate II, but only ABS polymer I, and those which contain from 30 to 80 parts, by weight, of ABS polymer I and from 70 to 20 parts, by weight, of aromatic polycarbonate II are prefered.

Preferred quantities of benzoin derivative are from 0.2 to 1%, of I or I+II.

Processing may subject such mixtures to temperatures of up to 300° C., especially when producing parts of large surface area. This may lead to surface faults in the form of blisters or streaks or smears and may cause marked yellow to brown discolouration.

The use of esters of phosphorous acid as stabilizers has been disclosed in European Patent Application No. 23 291. The stabilization obtained by this method is not sufficient for temperatures above 280° C. (see comparison experiment 7).

It has now been found that ABS polymer moulding compounds which have a considerably better colour in the raw state (less yellow to brown discolouration) than unstabilized material are obtained by the addition of benzoin derivatives and that such an addition to polycarbonate ABS moulding compounds results in products which are able to tolerate significantly higher temperature limits and at the same time have improved notched impact strength.

ABS polymers I stabilized according to the present invention contain from 5 to 100%, by weight, of a graft polymer (A.) and from 95 to 0%, by weight, of a thermoplastic copolymer (resin) (B.).

Graft polymers (A) for the present purposes are those in which either a monomer selected from styrene and methyl methacrylate or a monomer mixture of from 95 to 50%, by weight, of styrene, α-methyl styrene, nuclear-substituted styrene, methyl methacrylate or mixtures thereof and from 5 to 50%, by weight, of (meth)acrylonitrile, maleic acid anhydride, N-substituted maleimides or mixtures thereof is grafted on a rubber. Suitable rubbers include in particular polybutadiene and butadiene/styrene copolymers containing up to 30%, by weight, of a lower alkyl (such as $C_1$–$C_6$ alkyl) ester of acrylic or methacrylic acid (e.g. methyl acrylate), ethyl acrylate, methyl methacrylate or ethyl methacrylate).

Polyisoprene and polychloroprene are further examples of suitable rubbers. Alkyl acrylate rubbers based on $C_1$–$C_8$ alkyl acrylates, in particular on ethyl, butyl or ethylhexyl acrylate, are also suitable. Such alkyl acrylate rubbers may contain up to 30%, by weight, of monomers, such as vinyl acetate, acrylonitrile, styrene, methyl methacrylate or vinyl ether, incorporated by copolymerisation. Such alkyl acrylate rubbers may in addition contain small quantities (up to 5%, by weight) of ethylenically unsaturated monomers which have a cross-linking action. Examples include alkylene diol di-(meth)acrylate, polyester di-(meth)-acrylate, di- and tri-vinylbenzene, triallyl cyanurate, allyl (meth)acrylate, butadiene, isoprene. Alkyl acrylates of this type are known. Acrylate rubbers used as graft bases may also consist of products containing, as a core, a cross-linked diene rubber of one or more conjugated dienes, such as polybutadiene, or a copolymer of a conjugated diene with an ethylenically-unsaturated monomer, such as styrene, and/or acrylonitrile.

Diene monomer rubbers are preferred.

The graft copolymers (A) contain from 10 to 95%, by weight, in particular from 20 to 70%, by weight, of rubber and from 90 to 5%, by weight, in particular from 80 to 30%, by weight, of graft copolymerised monomers. The rubbers are contained in these graft copolymers in the form of at least partially cross-linked particles having an average particle diameter ($d_{50}$) of from 0.09 to 5 μm, in particular from 0.1 to 1 μm. graft polymers of this type may be prepared by radical Graft copolymerisation of monomers selected from styrene, α-methyl styrene, nuclear substituted styrene, (meth)acrylonitrile, methyl methacrylate, maleic acid anhydride or N-substituted maleimide in the presence of the rubbers which are to be grafted. Emulsion, solution, solvent-free and suspension polymerisation are the preferred methods of preparation for such graft copolymers.

Copolymers (B) may be synthesized from the graft monomers for (A) or similar monomers, in particular from at least one monomer selected from styrene, α-methyl styrene, halogen styrene, acrylonitrile, methacrylonitrile, methyl methacrylate, maleic acid anhydride, vinyl acetate and N-substituted maleimide. The copolymers are preferably composed of from 95 to 50%, by weight, of styrene, α-methyl styrene, methyl methacrylate or mixtures thereof and from 5 to 50%, by weight, of acrylonitrile, methacrylonitrile, methyl methacrylate, maleic acid anhydride or mixtures thereof. Copolymers of this type are also formed as by-products of graft polymerisation. It is customary to add separately prepared copolymers in addition to the copolymers contained in the graft polymer.

These additional copolymers need not be chemically identical with the ungrafted resin components present in the graft polymers.

Suitable separately prepared copolymers are resinous, thermoplastic and free from rubber. Particularly suitable examples are copolymers of styrene and/or α-methyl styrene with acrylonitrile, optionally in admixture with methyl methacrylate.

Particularly preferred copolymers are composed of from 20 to 40%, by weight, of acrylonitrile and from 80 to 60%, by weight, of styrene of α-methyl styrene. Such copolymers are known and may be prepared in particular by radical polymerisation, in particular by emulsion, suspension, solution or solvent-free polymerisation. The copolymers preferably have molecular weights of from 15,000 to $2 \times 10^5$.

Homopolycarbonates and copolycarbonates of one or more of the following diphenols are preferred aromatic polycarbonates (II) for the purposes of the present invention:
hydroquinone,
resorcinol,
dihydroxy biphenyls,
bis-(hydroxy phenyl)-alkanes,
bis-(hydroxy phenyl)-cycloalkanes,
bis-(hydroxy phenyl)-sulphides,
bis-(hydroxy phenyl)-ethers,
bis-(hydroxy phenyl)-ketones,
bis-(hydroxy phenyl)-sulphoxides, bis-(hydroxy phenyl)-sulphones, and
α,α'-bis-(hydroxy phenyl)-diisopropyl benzenes.

The phenyl groups in the above compounds may also carry alkyl or halogen substituents. These and other suitable diphenols have been described, for example, in U.S. Pat. Nos. 3,028,365; 2,999,835; 3,148,172; 3,285,601; 2,991,273; 3,271,367; 3,062,781 and 2,999,846, in German Offenlegungsschrift Nos. 1,570,703; 2,052,050; 2,062,052; 2,211,956 and 2,211,957, French Pat. No. 1,561,518 and the monograph, "H. Schnell, Chemistry and Physics of Polycarbonates, Interscience Publishers, New York, 1964".

The following diphenols are particularly preferred:
4,4'-dihydroxy-biphenyl,
2,2-bis-(4-hydroxyphenyl)-propane,
2,4-bis-(4-hydroxyphenyl)-2-methyl butane,
1,1-bis-(4-hydroxyphenyl)-cyclohexane,
α,α'-bis-(4-hydroxyphenyl)-p-diisopropyl benzene,
2,2-bis-(3-methyl-4-hydroxyphenyl)-propane,
2,2-bis-(3-chloro-4-hydroxyphenyl)-propane,
bis-(3,5-dimethyl-4-hydroxyphenyl)-methane,
2,2-bis-(3,5-dimethyl-4-hydroxyphenyl)-propane,
bis-(3,5-dimethyl-4-hydroxyphenyl-sulphone,
2,4-bis-(3,5-dimethyl-4-hydroxyphenyl)-2-methyl butane,
1,1-bis-(3,5-dimethyl-4-hydroxyphenyl)-cyclohexane,
α,α-bis-(3,5-dichloro-4-hydroxyphenyl)-propane, and
2,2-bis-(3,5-dibromo-4-hydroxyphenyl)-propane.

Preferred aromatic polycarbonates are those based on one or more of the above-mentioned preferred diphenols. Copolycarbonates based on 2,2-bis-(4-hydroxyphenyl)-propane and one or other of the particularly preferred diphenols mentioned are especially preferred. Polycarbonates alone based on 2,2-bis-(4-hydroxyphenyl)-propane or on 2,2-bis-(3,5-dimethyl-4-hydroxy phenol)-propane are also particularly preferred.

The aromatic polycarbonates may be prepared by known processes, e.g. by a solvent-free ester interchange from bisphenol and diphenyl carbonate or in solution from bisphenols and phosgene. The solution may be homogeneous ("pyridine process") or heterogeneous ("two-phase interface process"). According to the present invention, polycarbonates which have been prepared in solution, in particular by the two-phase interface process, are particularly suitable.

The aromatic polycarbonates may be branched by the incorporation of small quantities, preferably from 0.05 to 2.0 mol %, (based on the quantity of diphenols used), of trifunctional or higher than trifunctional compounds, e.g. those having three or more than three phenolic hydroxyl groups.

The aromatic polycarbonates should generally have average molecular weights $M_w$ (weight average) of from 10,000 to over 200,000, preferably from 20,000 to 80,000 (determined by measurements of the relative viscosity in $CH_2Cl_2$ at 25° C. and using a concentration of 0.5%, by weight).

The benzoin derivatives corresponding to the following general formula:

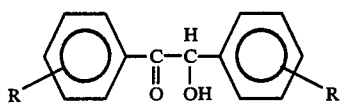

(I)

are known in the literature or may be prepared by methods known from the literature (see Beilstein 31.8, page 167), in particular by the condensation of benzaldehyde or substituted benzaldehyde in the presence of small quantities of potassium cyanide in aqueous or aqueous alcoholic solution.

In the above general formula, each R represents, independently of the other, hydrogen, halogen, such as chlorine or bromine, or $C_1-C_6$ alkyls, such as methyl, ethyl, propyl, isopropyl, butyl pentyl or hexyl.

Benzoin (R represents hydrogen) is particularly preferred.

The stabilizers according to the present invention may be incorporated in the moulding compounds by any desired method, for example by compounding of the melt at temperatures of from 200° to 330° C. in conventional apparatus, such as internal kneaders, extruders or double-shaft screw mixers. The stabilizers may be used pure or as concentrates in one of the other constituents. They may also be added already at the stage of preparation, for example in the case of the ABS plastics to be stabilized they may be added as an aqueous emulsion to the latex of an ABS plastics.

The conventional additives, such as pigments, fillers, lubricants, mould release agents and the like, may, of course, be added to the moulding compounds in addition to the stabilizers according to the present invention. Other known stabilizers may also be added, for example cyclic phosphites.

The moulding compounds according to the present invention may be used for the production of various types of moulded articles, in particular for the production of articles by injection moulding. The following are examples of moulded articles which may be produced.

Housing parts of all types (e.g. for domestic applicances, such as juice extractors, coffee machines, mixers) or coverplates or access panels for use in the building industry, or parts for the motor vehicle industry. They are also used in electrical engineering on account of the good electrical properties thereof. The compounds may also be processed to produce moulded articles by deep drawing from previously produced panels or films.

The term "particle size" invariable denotes the average particle diameter $d_{50}$, determined by ultracentrifuge measurements according to W. Scholtan et al, Kolloidz. u.Z. Polymere 250 (1972) 782–796.

EXAMPLES

Polymers and polycondensates used:

A. SAN graft polymer of 50%, by weight, of styrene/acrylonitrile mixture (in proportions, by weight, of 72:28) on 50% by weight of particulate polybutadiene having an average particle size ($d_{50}$) of 0.4 μm, obtained by emulsion polymerisation.

B. Styrene/acrylonitrile copolymer having a styrene: acrylonitrile ratio of 70:30 and a viscosity of $[\eta]=0.55$ dl/g (determined in dimethyl formamide at 20° C.

C. Aromatic polycarbonate of 2,2-bis-(4-hydroxyphenyl)propane (bisphenol A) having a relative viscosity of 1.26 determined in $CH_2Cl_2$ at 25° C. (0.5% by weight, solution).

$III_1$. Benzoin, melting point 133°–136° C.

$III_2$. Phosphorus acid ester of bis-(2-hydroxy-3-cyclohexyl)-5-methylphenyl)-methane (stabilizer according to EP-A No. 23 291).

EXPERIMENTS 1 AND 2 AND COMPARISON EXPERIMENT 3

The moulding compounds according to the present invention and the comparison materials were produced by melt compounding in an internal kneader (capacity 3.8 liters) (model LK 1 of Francis-Shaw) at a temperature of 200° C.

To determine the lightness of colour (raw tone) of the samples, sample plates measuring 60×40×2 mm were prepared. The apparatus used was a Monomat 25 operating under the following conditions:

Speed of rotation of screw: 100/min
Speed of injection: 2.5 s
After-pressure: 60 bar
Residence time of material in the apparatus 6.5 min The measurement of lightness and yellowing was carried out according to DIN 6174 by determining the standard colour values X and Z by means of a colorimeter MS 2025 of Macbeth on unpigmented, naturally coloured sample plates.

Injection temperatures of 220° C. 260°, 280° and 300° C. were chosen. The samples obtained were then tested for lightness of colour. The values obtained in dependence upon the injection temperature are shown in accompanying FIGS. 1 and 2. The following Table shows the composition of the tested moulding compounds.

|  | A (parts, by weight) | B (parts, by weight) | $III_1$ (parts, by weight) |
|---|---|---|---|
| Experiment 1 | 40 | 60 | 0.25 |
| 2 | 40 | 60 | 0.5 |
| 3 (comparison) | 40 | 60 | — |

Figure 2:
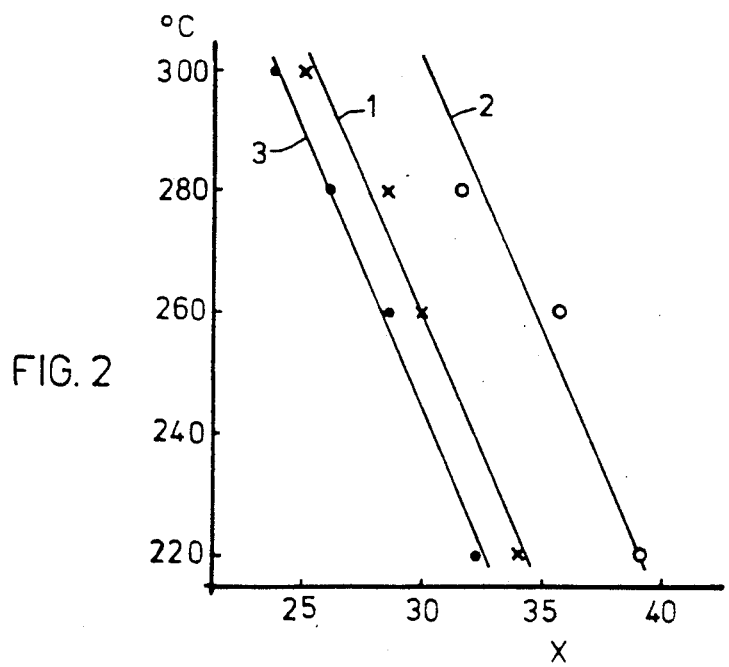

Accompanying FIGS. 1 and 2 show that the addition of benzoin distinctly improves the raw tone of the moulding compounds.

EXPERIMENTS 4 AND 5 AND COMPARISON EXPERIMENTS 6 AND 7

The moulding compounds according to the present invention and the comparison materials were prepared by compounding the individual components in a double-shaft extruder (ZSK 53, Werner & Pfleiderer). In this process, the products were mixed at a mass temperature of 240° C., a speed of rotation of 60 revs per min and a rate of throughput off 24 kg/h and then granulated.

Flat rods (50 mm×6 mm×4 mm) with a V-shaped notch (depth of notch 2.7 mm) were prepared by injection moulding at 260° C. and 280° C. to determine the notched impact strength, which was tested according to DIN 53 452/ISO R 179.

To determine the limit of temperature endurance, the material to be tested was dried in a Turbetuve at 110° C. for from 2 to 3 hours and then extruded to form sample plates measuring 60×40×2 mm. The apparatus used was a Monomat 25 operated under the following conditions:

Speed of rotation of screw: 100/min
Speed of injection: 2.5 s after-pressure: 60 bar
Residence time of the material in the apparatus: 6.5 min The mass temperature was raised from 220° C. to 300° C. at 10° C. intervals. 10 sample plates were prepared at each temperature and assessed visually for surface characteristics. The limit of temperature tolerance was taken to be the temperature at which the first surface defects appeared (e.g. streaks).

The composition of the tested materials and the data obtained are entered in Table 2.

TABLE 2

| | A parts, by weight | B parts, by weight | C parts, by weight | III$_1$ parts, by weight | III$_2$ parts, by weight | Injection moulding temperature °C. | Notched impact strength KJ/m$^2$ | Limit of temperature endurance °C. |
|---|---|---|---|---|---|---|---|---|
| Experiment 4 | 24 | 16 | 60 | 0.1 | — | 260 | 47 | 290 |
| | | | | | | 280 | 38 | |
| Experiment 5 | 24 | 16 | 60 | 0.3 | — | 260 | 50 | 300 |
| | | | | | | 280 | 41 | |
| Experiment 6 (comparison) | 24 | 16 | 60 | — | — | 260 | 41 | 270 |
| Experiment 7 (comparison) | 24 | 16 | 60 | — | 0.25 | 260 | 45 | 280 |
| | | | | | | 280 | 21 | |

We claim:
1. A thermoplastic molding composition which is comprised of a plastic and from 0.05 to 2%, by weight, based on the plastic of a heat stabilizing benzoin derivative corresponding to the following general formula:

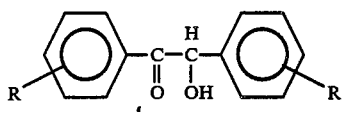

wherein R independently represents hydrogen, halogen or $C_1$–$C_6$ alkyl, said plastic to be stabilized comprised of:
I—from 100 to 20 parts, by weight, of:
  A—from 5 to 100%, by weight, of a graft copolymer comprising:
    A1—from 10 to 95%, by weight, of a mixture comprising:
      A1.1—from 50 to 90%, by weight, of styrene, α-methyl styrene, nuclear-substituted styrene, methyl methacrylate or mixtures thereof; and
      A1.2—from 50 to 10%, by weight, of (meth)acrylonitrile, methyl methacrylate, maleic acid anhydride, N-substituted maleimide or mixtures thereof; onto
    A2—from 90 to 5%, by weight, of a rubber having a glass transition temperature $T_G$ of 0° C.; or less and
  B—from 95 to 0%, by weight, of a thermoplastic copolymer comprising:
    B1—from 90 to 50%, by weight, of styrene, α-methyl styrene, nuclear-substituted styrene, methyl methacrylate or mixtures thereof; and
    B2—from 50 to 10%, by weight, of (meth)acrylonitrile, methyl methacrylate, maleic acid anhydride, N-substituted maleimide or mixtures thereof; and
II—from 0 to 80 parts, by weight, of an aromatic polycarbonate.

2. A composition as claimed in claim 1 wherein there is present from 0.2 to 1% of benzoin derivative.
3. A composition as claimed in claim 1 wherein the plastics to be stabilised comprises:
  from 5 to 80%, by weight, of A containing
  from 10 to 80%, by weight, of A1 and
  from 90 to 20%, by weight, of A2; and
  from 95 to 20%, by weight, of B.

* * * * *